April 4, 1961

W. T. CHATER 2,978,615

ELECTRIC TRIGGER CIRCUITS

Filed May 1, 1957

INVENTOR.

WILLIAM T. CHATER,

BY

Harold L. Jackson

ATTORNEY

United States Patent Office 2,978,615

Patented Apr. 4, 1961

2,978,615

ELECTRIC TRIGGER CIRCUITS

William T. Chater, El Segundo, Calif., assignor to Hughes Aircraft Company, Culver City, Calif., a corporation of Delaware Filed May 1, 1957, Ser. No. 656,283

9 Claims. (Cl. 317—148.5)

Figure 1:
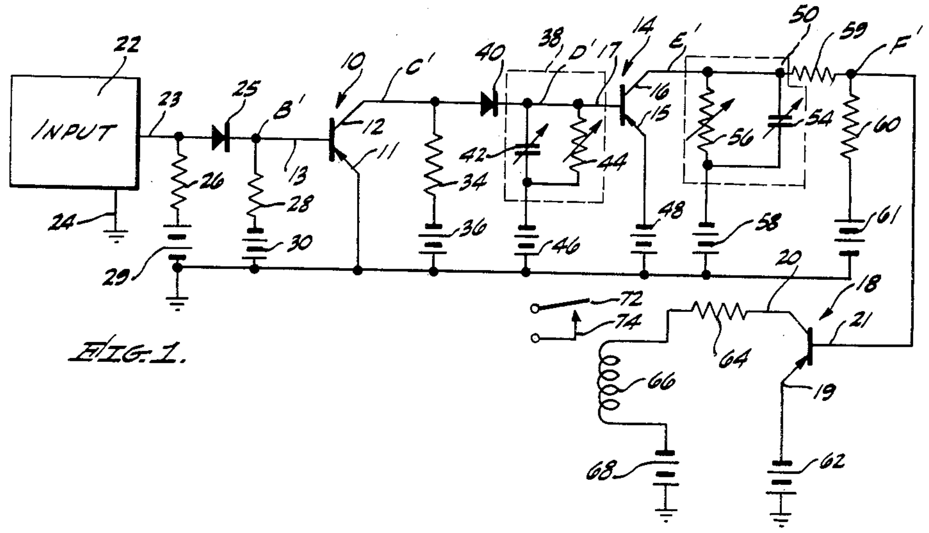

The present invention relates to trigger circuits and more particularly to a trigger circuit responsive to alternating-current or pulsating direct-current signals.

Trigger circuits responsive to alternating-current or pulsating direct-current signals are useful in many applications. One such application involves the control of relays in various types of servomechanisms and electronic computers. Relays are often used without such trigger circuits, but in many instances the power requirement of the relay control winding is too large to be supplied by the source of control current for the relay. To circumvent this disadvantage, relays have been made more sensitive so that a small current will close the relay. However, such high sensitivity results in an expensive relay and also in a relay that may not be sufficiently rugged or reliable for many applications.

Direct-current (D.C.) amplifiers have also been used to close insensitive relays from low power sources, but such amplifiers are subject to drift and are expensive. Furthermore, where the input current to a D.C. amplifier that is controlling the relay is not filtered sufficiently, there is a likelihood of relay chatter due to the alternating-current component of the direct-current input signal.

Furthermore, where it is desired to control a relay by an alternating-current or pulsating direct-current signal of a predetermined magnitude, polarity and repetition rate, it is difficult to adjust either a relay by itself or a relay in conjunction with a D.C. amplifier to insure positive operation.

It is accordingly an object of the present invention to provide a trigger circuit which will produce an output signal in response to an alternating-current or pulsating direct-current input signal which is not subject to drift and requires little power from the current source.

It is another object of the present invention to provide a trigger circuit which will unalterably produce an output signal in response to the application of an input signal of a predetermined polarity and minimum magnitude and of a repetition rate that is in excess of a certain minimum repetition rate.

It is a further object of the present invention to provide a trigger circuit for controlling the current flow through a relay winding by an alternating-current or pulsating direct-current signal which will prevent relay chatter.

It is still a further object of the present invention to provide a trigger circuit for closing a relay in response to an alternating-current input signal having voltage excursions that are greater than a predetermined amplitude and having alternations per second in excess of a given repetition rate whereby the relay will open if the input signal does not have these characteristics.

In accordance with the present invention, an apparatus is provided which includes a first, second, and third signal translating devices, each device having an input and an output circuit. First time constant means is coupled between the output circuit of the first signal translating device and the input circuit of the second translating device for controlling the conduction of the second signal translating device for a first predetermined time interval after a signal is developed in the output circuit of the first device. Second time constant means is coupled between the output circuit of the second signal translating device and the input circuit of the third signal translating device for controlling the conduction of the third signal translating device for a second predetermined time interval after a signal is developed in the output circuit of the second device, whereby a signal is developed in the output circuit of the third signal translating device in response to the application of an input signal of predetermined polarity, an amplitude greater than a certain minimum value and a repetition rate that is in excess of a certain minimum rate.

Figure 2:
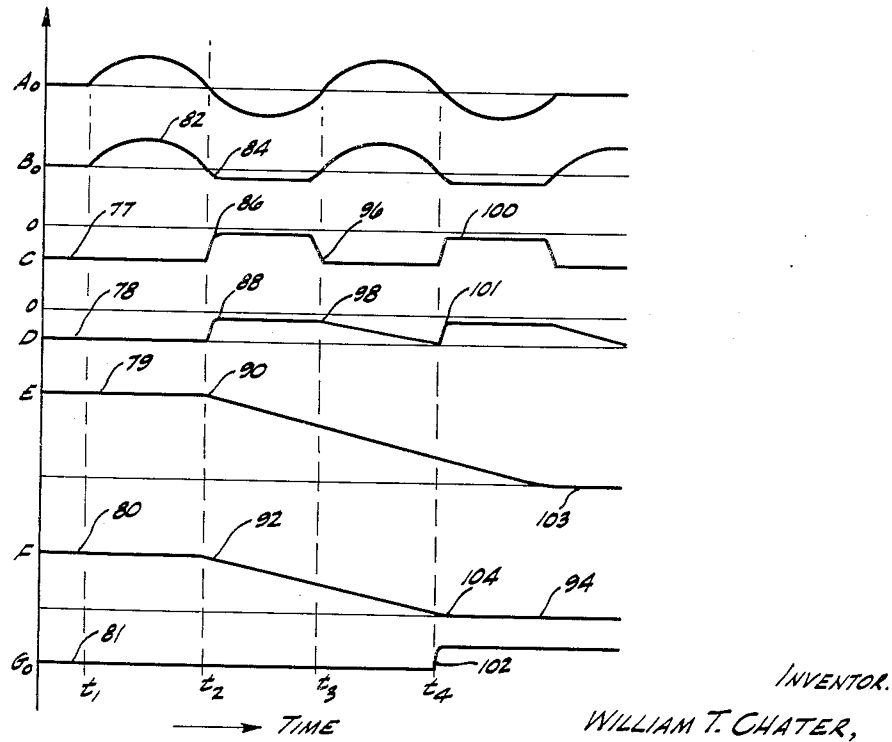

The novel features which are believed to be characteristic of the invention both as to its organization and method of operation, together with further objects and advantages thereof will be better understood from the following description considered in connection with the accompanying drawing in which:

Fig. 1 is a schematic circuit diagram of a trigger responsive apparatus embodying the principles of the present invention for controlling the current flow through a relay winding in response to an input signal; and Fig. 2 is a graph illustrating waveforms taken at various points in the circuit of Fig. 1.

Referring now to the drawing, and more particularly to Fig. 1, there is shown a trigger circuit which includes three signal translating devices, 10, 14, and 18. The signal translating devices are illustrated as junction transistors of the p-n-p type. It is to be understood that other types of signal translating devices may be utilized as the active elements of the trigger circuit with appropriate changes of the operating voltages to insure their proper operation. If, for example, it is desired to utilize junction transistors of the n-p-n type, it is necessary to use bias voltages of the opposite polarity than those shown in Fig. 1.

The transistor 10 includes an emitter electrode 11, a collector electrode 12 and a base electrode 13; the transistor 14 includes an emitter electrode 15, a collector electrode 16 and a base electrode 17, and the transistor 18 includes an emitter electrode 19, a collector electrode 20 and a base electrode 21.

An input signal source 22 having two output terminals 23 and 24 is connected across the base-emitter junction of the transistor 10 by means of a gating element 25, such as a semiconductor diode. As is shown, the anode of diode 25 is connected to the output terminal 23, the cathode of the diode 25 is connected to the base 13, and the terminal 24 is connected to ground.

A resistor 26 is connected between the anode of the diode 25 and a positive terminal of a source of direct-current energizing potential 29 such as a battery, and a resistor 28 is connected between the cathode of this diode and a negative terminal of another source of direct-current energizing potential 30 which may also be a battery. The values of the potential sources 29 and 30 are chosen to bias the diode 25 in the forward direction and also render the transistor 10 nonconducting in the absence of a negative input signal of the proper amplitude. The emitter 11 is connected to ground to complete the base-emitter circuit of the transistor 10.

The collector 12 is energized through a resistor 34 by a negative source of energizing potential such as a battery 36.

A gating element 40 which may be a semiconductor diode is connected between the collector 12 and the base 17. The anode of the diode 40 is connected to the collector 12 and the cathode of the diode 40 is connected directly to the base 17. A first time constant network indicated by the dashed line box 38 is connected across the base-emitter junction of the transistor 14 for integrating and smoothing the signal that is developed at the collector 12. This time constant network includes a storage element such as a capacitor 42, and a direct-current impedance element such as a resistor 44 connected in parallel. This time constant network is connected between the base 17 and a negative terminal of a source of direct-current potential 46 such as a battery. Both the capacitor 42 and the resistor 44 are illustrated as being adjustable to permit the time constant of the network 38 to be conveniently changed.

The emitter of the transistor 14 is energized from a suitable source of negative potential 48 such as a battery. The source 46 has a larger negative value than the source 48 to bias the base-emitter junction of the transistor 14 in the forward direction and render the transistor 14 conducting, in the absence of a signal of sufficient magnitude being stored across the capacitor 42. The emitter-collector circuit of the transistor 14 is completed through a resistor 56 to a suitable source of negative potential 58 such as a battery. This resistor 56 is part of a second time constant network indicated by dashed line 50 that is connected across the emitter-collector or output circuit of the transistor 14. This second time constant network 50 also includes a parallel connected storage element such as a capacitor 54 and the D.C. impedance element or resistor 56. The capacitor 54 and the resistor 56 are also illustrated as being adjustable to permit the time constant of this network 50 to be conveniently changed.

A pair of voltage divider resistors 59 and 60 are connected in series between the collector 16 and a positive terminal of a suitable source of direct current energizing potential 61 such as a battery. The junction point of these resistors is connected directly to the base 21 of the transistor 18. A source of negative potential 62 such as a battery, is connected to the emitter 19 to bias the base-emitter junction in the reverse direction during the time that the transistor 14 is conducting.

The collector 20 is connected in series with a resistor 64 and a relay winding 66 to a suitable source of direct-current energizing potential 68 such as a battery. The current flowing through the relay winding 66 controls the position of the relay contacts 72 and 74. The relay contacts are shown in their open position as a result of zero current flow through the winding 66.

In discussing the operation of the circuit of Fig. 1, reference is now made to Fig. 2 wherein the abscissa represents time and the ordinate voltage in part and current in part.

The curve A represents the voltage waveform of the input signal to the trigger circuit from the input source 22; the curve B was taken by measuring the voltage between the point B′ and ground; similarly, the curves C, D, E and F were taken by measuring the voltage between the points C′, D′, etc. and ground; and the curve G was taken by measuring the current flow through the winding 66.

Referring to Fig. 2, the input voltage A during the time interval from 0 to $t_1$ is slightly positive to maintain the point B′ at or above ground potential. However, this voltage is illustrated as approximately zero voltage due to the small magnitude of the voltage drop across the diode 25. Hence, the base emitter junction of the transistor 10 is biased so that during this time interval no current is flowing in the collector circuit of this transistor. Hence, the voltage between the point C′ or the collector 12 and ground is at some negative value corresponding to the voltage battery 36 as is illustrated by 77 in the curve C.

As has been discussed previously, the transistor 14 is conductive during this time interval due to its base-emitter bias and hence the voltage between the point D′ and ground, as shown by 78 on the curve D, is slightly more negative than the potential at the emitter 15 as a result of the small voltage drop across the forward biased base-emitter junction.

The voltage drop across the emitter-collector electrodes of the transistor 14 is also small and the voltage between the collector 16, or the point E′ and ground, is approximately equal to the voltage of the source 48 as is illustrated by 79 on the curve E.

The voltage at point F′ is positive with respect to the emitter 19 as illustrated by 80 on the curve F and biases the base-emitter junction of the transistor 18 in the reverse direction. Hence, the current flow through the coil 66 is zero as is shown by 81 on the curve G.

During the time interval from $t_1$ to $t_2$, the positive going portion of a sine wave voltage illustrated by wave A is applied across the base-emitter junction of the transistor 10 by means of the diode 25. Since this voltage is positive, the diode 25 is biased in the forward direction and the point B′ goes positive with respect to ground as is shown by 82 on the curve B. This positive going signal merely biases the base-emitter junction of the transistor 10 further in the reverse direction and hence transistor 10 is maintained nonconducting during this time interval. Of course, the remaining portion of the circuit of Fig. 1 remains in the same state during the time interval from $t_1$ to $t_2$ as during the time interval from 0 to $t_1$ with transistor 14 conducting and transistor 18 non-conducting.

At time $t_2$ the input signal A goes negative with respect to ground making the anode of the diode 25 more negative than its cathode which biases this diode in the reverse direction. Since this diode is biased in the reverse direction, the resistor 28 and the battery 30 cause the base 13 to go negative with respect to the emitter 11 or ground as is indicated by 84 on the curve B. As the base 13 goes negative, the base-emitter junction of the transistor 10 is biased in a forward direction and renders transistor 10 conducting. As a result of the conduction of the transistor 10, the point C′ goes positive as is shown by 86 on the curve C which drives the anode of the gating diode 40 more positive than its cathode and renders this diode conducting.

Since the potential drop across the emitter and collector electrodes of the conducting transistor 10 and the potential drop across the forward biased gating diode 40 are small, the voltage that is impressed on the capacitor 42 or between the point D′ and ground is approximately equal to the potential of the emitter 11 or zero as is shown by 88 on the curve D. This potential at the point D′ biases the base-emitter junction of the transistor 14 in the reverse direction and thereby cuts this transistor off.

This action is reflected as a negative going signal between the collector 16 or the point E′ and ground as is shown by 90 on the curve E. The slope of this negative going signal 90 is determined by the time constant of the network 50 and more particularly by the values of the capacitor 54 and the resistor 56. The rate of decay of the voltage between E′ and ground may be decreased by increasing the resistance of the resistor 56 or the capacitance of the capacitor 54. This negative going signal 90 is reflected at point F′ as another negative going signal having a proportionate rate of decay as is illustrated by 92 on the curve F.

The bias conditions of the base-emitter junction of the transistor 18 as determined by the sources of potentials 62 and 58 are such that the transistor 18 will remain non-conducting until the point F′ or the base of the transistor 18 reaches a potential slightly more negative than that of the emitter 19. This critical base potential of the transistor 18 is illustrated by the voltage level 94 on the curve F. Since the voltage at the point F′ does not decrease to the value as indicated by 94 during the time interval from $t_2$ to $t_3$ the transistor 18 will remain nonconducting during this interval.

At time $t_3$ the positive going portion of the input sine wave A is again applied across the base-emitter circuit of the transistor 10 by means of the diode 25. As a result of this positive voltage, the transistor 10 is rendered nonconducting during this positive portion of the input sine wave A as has been discussed before. The collector potential of the transistor 10 or the potential between C' and ground again falls to a negative value as is indicated by 96 on the curve C. The potential between the point D' or the base of the transistor 14 and ground begins to decrease as is shown by 98 on the curve D; however, the potential between the base 17 or the point D' and ground that is required to render the transistor 14 conducting is indicated by line 78 and since the voltage at D' at this time is more positive than the voltage 78, the transistor 14 will remain nonconducting.

The slope of the negative going signal 98 is determined by the time constant of the network 38 which, in turn, is determined by the values of the capacitor 42 and the resistor 44. As is shown by the curve D, the decay of the signal that is stored in the capacitor 42 of network 38 is such as to maintain the transistor 14 nonconducting until a period of time after $t_4$. Hence, during the time interval from $t_3$ to $t_4$ the transistor 14 will remain nonconducting and the voltage between the point E' and ground will continue to decrease as a result of the action of the second network 50. The potential between the base 21 and ground as shown by the curve F will also continue to decrease.

At the time $t_4$ the negative going portion of the sine wave A is again applied across the base-emitter junction of the transistor 10. Hence, the transistor 10 is again rendered conducting and its collector goes positive with respect to ground as is shown by 100 on the curve C. This voltage pulse at point C' again biases the diode 40 in the forward direction and applies a positive potential across the capacitor 42 of the network 38. This voltage which is indicated by 101 on the curve D restores the positive charge on the capacitor 42 before the resistor 44 has entirely dissipated the energy or charge stored on the capacitor 42 by the signal developed previously in the collector circuit of the transistor 10. As a result of this restored charge on the capacitor 42, the transistor 14 will be maintained in a nonconducting state and the voltage between the collector 16 or the point E' and ground will continue to decrease until it reaches a stable negative voltage level 103 as is illustrated on the curve E. This voltage level 103 is determined by the current flow through the resistor 56 due to the conduction of the transistor 18.

Shortly after time $t_4$ the voltage between the point F' or the base 21 and ground as shown by 104 on the curve F has decreased to the critical value 94 and the transistor 18 is rendered conducting at this time. Current now flows through the emitter-collector circuit of the transistor 18 and through the coil 66 as indicated by 102 on the curve G. The voltage between the base 21 or the point F' and ground will continue to remain at the voltage level 94 and hence maintain the transistor 18 conducting as long as the transistor 14 is maintained in a nonconducting state.

Thus, the trigger circuit disclosed in Fig. 1 will continue to produce an output signal as long as the input signal pulses or sine waves continue to be applied across the base-emitter junction of the transistor 10 of or greater than a certain amplitude and a periodicity in excess of a certain repetition rate to maintain the transistor 14 nonconducting. When the repetition period between the input pulses increases or when the input pulse amplitude drops to a magnitude insufficient to maintain the voltage on the capacity 42 or at the point D' above the voltage level 78 as shown on the curve D, the trigger circuit will produce an output signal for one complete time interval, such as from $t_1$ to $t_3$ and then will cease to produce an output signal.

If a relay having a control winding 66, as is shown in Fig. 1, is connected to the output circuit of the transistor 18, the trigger circuit will pick up or close the relay contacts on application two input pulses of appropriate magnitude, polarity and repetition rate, and will drop out the relay or open the relay contacts one complete time interval after the last input signal has been applied to the transistor 10. Hence, the trigger circuit will not close the relay upon the application of an extraneous or single input pulse to the base-emitter circuit of the transistor 10.

While it is understood that the circuit specifications of the trigger circuit of the present invention may vary according to the desired design for any particular application, the following circuit specifications for the circuit of Fig. 1 are included by way of example only:

| | |
|---|---|
| Transistor **10, 14** and **18** | Type GE 2N123 or GE 2N136, manufactured by the General Electric Company. |
| Source of potential **29** | +30 volts. |
| Source of potential **30** | −20 volts. |
| Source of potential **36** | −10 volts. |
| Source of potential **46** | −20 volts. |
| Source of potential **48** | −7.5 volts. |
| Source of potential **58** | −20 volts. |
| Source of potential **61** | +30 volts. |
| Source of potential **62** | −7.5 volts. |
| Source of potential **68** | −20 volts. |
| Resistor **26** | 15,000 ohms. |
| Resistor **28** | 11,000 ohms. |
| Resistor **34** | 10,000 ohms. |
| Resistor **44** | 27,000 ohms. |
| Resistor **56** | 2,200 ohms. |
| Resistor **59** | 1,500 ohms. |
| Resistor **60** | 27,000 ohms. |
| Resistor **64** | 160 ohms. |
| Semiconductor diodes **25** and **40** | Type HD2754 manufactured by Hughes Aircraft Company. |
| Capacitor **42** | 2 microfarads at 30 v. D.C. |
| Capacitor **54** | 50 microfarads at 25 v. D.C. |
| Relay winding **66** | The central winding of a type HGP 1007 relay manufactured by the Clare Co. |

The above circuit specifications provide a trigger circuit which will produce an output signal or close a relay in response to a 60 cycle alternating-current or pulsating direct-current signal of a negative polarity. As these circuit specifications disclose, the respective values of the resistors and capacitors of the networks 38 and 50 are different to provide different time constants for the two networks. Generally it will be necessary to provide the networks 38, 50 with different time constants, but in certain applications both of the networks 38, 50 may have the same time constant. Also, it is to be understood that the threshhold value of the input signal necessary to render the transistor 10 conducting may be changed to any desired value by appropriately biasing the emitter electrode 11.

There has thus been provided a trigger responsive apparatus capable of effecting the positive closing of a relay in response to an input signal having a certain minimum of magnitude, proper polarity, and a repetition rate in excess of a certain minimum rate. This trigger responsive apparatus may be operated by a small voltage amplitude input signal and requires very little current from the input source to operate the relay.

What is claimed is:

1. A trigger circuit comprising: a first transistor having a first input and a first output circuit, means coupled to said first input circuit for rendering said first transistor conducting in response to the application of an input signal of a predetermined polarity and magnitude, a first storage element connected across said first output circuit, a first direct-current impedance element connected across said storage element for dissipating the energy stored in said storage element in a first predetermined time relationship, a second transistor having a second input and a second output circuit, said second input circuit being connected across said first storage element for rendering said second transistor nonconducting in response to a first predetermined voltage existing across said storage element, a second storage element connected across said second output circuit, a second direct-current impedance element connected across said second storage element for dissipating the energy stored in said second storage element in a second predetermined time relationship, a third transistor having a third input and a third output circuit, said third input circuit being connected across said second storage element for rendering said third transistor conducting in response to a second predetermined voltage existing across said second storage element, and means connected to said third output circuit responsive to an output signal therefrom.

2. A trigger circuit comprising: a first junction transistor having a first emitter, a first base and a first collector, a gating network coupled between said first base and said first emitter and adapted to render said first transistor conducting in response to the application of an input signal of a predetermined polarity and magnitude to said gating network, a second junction transistor having a second base, a second emitter and a second collector, said second base being coupled to said first collector, a first network coupled between said second base and said second emitter for integrating and smoothing the voltage appearing therebetween, a third junction transistor having a third base, a third emitter and a third collector, said third base being coupled to said second collector, a second network connected between said second collector and said third emitter for integrating and smoothing the voltage appearing therebetween, and a control winding for a relay connected in series with said third collector and said third emitter for responding to an output signal from said third transistor.

3. A trigger responsive apparatus comprising: a first junction transistor having a first emitter, a first base and a first collector, means including a diode coupled between said first base and said first emitter adapted to render said first transistor conducting in response to the application of an input signal of a predetermined polarity and magnitude to said diode, a second junction transistor having a second base, a second emitter and a second collector, said second base being coupled to said first collector, a first parallel connected capacitor and resistor connected between said second base and said second emitter, a third junction transistor having a third base, a third emitter and a third collector, said third base being coupled to said second collector, a second parallel connected capacitor and resistor connected between said third base and said third emitter, and means connected to the output of said third transistor for deriving an output signal therefrom upon the application of an input signal to said first transistor of a predetermined polarity of an amplitude greater than a minimum amplitude, and of a repetition rate in excess of a predetermined minimum rate.

4. A trigger responsive apparatus comprising a first signal translating stage having a first input and a first output circuit; means coupled to said first input circuit for controlling the conduction of said first stage in accordance with an input signal of predetermined polarity and of at least a predetermined minimum amplitude; a second signal translating stage having a second input and a second output circuit; means coupled between said first and second signal translating stages for integrating and smoothing the voltage across said first output circuit to produce an output signal to control the conductivity of said second signal translating stage; and means coupled to said second output circuit and responsive to the conductivity of said second signal translating stage for controlling the state of a bistable utilization device.

5. A trigger responsive apparatus comprising a first signal translating stage including a first transistor having a first input and a first output circuit; means coupled to said first input circuit for controlling the conduction of said first transistor in accordance with an input signal of a predetermined polarity and of at least a predetermined minimum amplitude to produce a first output signal; a second signal translating stage including a second transistor having a second input and a second output circuit; first means coupled between said first and second signal translating stages for integrating and smothing the voltage appearing across said first output circuit to control the conductivity of said second signal translating stage; a third signal translating stage having a third input and a third output circuit; second means coupled between said second and third signal translating stages for integrating and smoothing the voltage appearing across said second output circuit to produce a second output signal to control the conductivity of said third signal translating stage; and means coupled to said third output circuit and responsive to an output signal therefrom for controlling the state of a bistable utilization device.

6. The trigger responsive apparatus as defined in claim 5 where said first and second means each comprise a capacitor and resistor connected in parallel.

7. The trigger responsive apparatus as defined in claim 6 wherein said capacitors and resistors of said first and second means are adjustable.

8. A trigger responsive apparatus comprising a first signal translating stage having a first input and a first output circuit; means coupled to said first input circuit for controlling the conduction of said first stage in accordance with a pulse-type input signal of predetermined polarity and of at least a predetermined minimum amplitude, said pulse-type input signal having a predetermined pulse repetition rate; a second signal translating stage having a second input and a second output circuit; means coupled between said first and second signal translating stages for integrating and smoothing the voltage appearing across said first output circuit thereby to render said second signal translating stage conductive in response to no less than two successively received pulses within a predetermined period of time; and means coupled to said second output circuit and responsive to the conductivity of said second signal translating stage for controlling the state of a bistable utilization device.

9. The trigger responsive apparatus as defined in claim 8 wherein said last named means includes a third signal translating stage having a third input and a third output circuit; additional means coupled between said second and third signal translating stages for integrating and smoothing the voltage appearing across said second output circuit, said additional means having a time constant of sufficient magnitude to maintain said third signal translating stage conductive for a period greater than one pulse repetition period of said input signal; and a bistable utilization device connected to said third output circuit, the state of said bistable device being dependent upon conduction through said third signal translating stage.

References Cited in the file of this patent

UNITED STATES PATENTS

| | | |
|---|---|---|
| 2,507,211 | Manke et al. | May 9, 1950 |
| 2,517,960 | Barney et al. | Aug. 8, 1950 |
| 2,594,336 | Mohr | Apr. 29, 1952 |
| 2,718,613 | Harris | Sept. 20, 1955 |
| 2,811,590 | Doremus et al. | Oct. 29, 1957 |